United States Patent Office 3,658,749
Patented Apr. 25, 1972

3,658,749
MODIFIED OXYMETHYLENE POLYMERS
Michael E. Gordon, Wayland, Mass., assignor to Celanese Corporation, New York, N.Y.
No Drawing. Filed June 16, 1970, Ser. No. 46,821
Int. Cl. C08g 51/04
U.S. Cl. 260—37 PC
10 Claims

ABSTRACT OF THE DISCLOSURE

A modified oxymethylene polymer is disclosed and claimed which comprises an oxymethylene polymer and an hydrophobic silica. The claimed composition has improved hardness, and tensile strength over the unmodified oxymethylene polymer without a marked sacrifice of flexibility and impact strength.

---

This invention relates broadly to oxyalkylene polymers and, more particularly, to modified oxyalkylene polymers (both homopolymers and copolymers) having improved hardness and tensile strength.

Oxyalkylene polymers, specifically oxymethylene polymers having recurring —$CH_2O$— units, have been known for many years. They may be prepared by the polymerization of anhydrous formaldehyde or by the polymerization of trioxane, which is a cyclic trimer of formaldehyde.

High molecular-weight oxymethylene polymers have been prepared by polymerizing trioxane in the presence of certain fluoride catalysts. They may also be prepared in high yields and at rapid reaction rates by the use of catalysts, comprising boron fluoride coordination complexes with organic compounds, as described in U.S. Pat. No. 2,989,506 of Donald E. Hudgin and Frank M. Berardinelli.

Other methods of preparing oxymethylene polymers are disclosed by Kern et al. in Angewandte Chemie, 73 (6), 177–186 (Mar. 21, 1961), and in Sitting "Polyacetals: What You Should Know," Petroleum Refiner, 41, 11, 131–170 (November 1962), including polymers containing repeating carbon-to-carbon single bonds in the polymer chain and which are made by copolymerizing trioxane with cyclic ethers, e.g., dioxane, lactones, e.g., beta-propiolactone, anhydrides, e.g., cyclic adipic anhydride, and ethylenically unsaturated compounds, e.g. styrene, vinyl acetate, vinyl methyl ketone, acrolein, etc.

Also contemplated in the production of modified oxyalkylene, specifically oxymethylene, polymeric compositions of the instant invention are oxymethylene polymers the end groups of which are reacted or "capped" with, for example, a carboxylic acid or a monomeric ether. Typical capping agents are alkanoic acids (e.g., acetic acid), which form ester end groups, and dialkyl ethers (e.g., dimethyl ether), which form ether end groups.

Still other oxymethylene polymers, more particularly copolymers, which are adapted for use in producing the modified oxymethylene polymers of this invention are those which are prepared as described in U.S. Patent No. 3,027,352 of Walling et al. by copolymerizing, for example, trioxane with any of various cyclic ethers having at least two adjacent carbon atoms, e.g., ethylene oxide, dioxolane, and the like.

Oxymethylene polymers are distinguished by a number of excellent properties so that they are suitable for a variety of industrial applications. Many of these desirable properties result from the fact that these oxymethylene polymers are crystalline. Microscopic examination of thin sections of such polymers shows that there is a non-homogenous coarse spherulitic structure, with the average spherulite diameter being about 100 to 500 microns.

For many applications, however, it is desirable to have an oxymethylene polymer of increased hardness and tensile strength and dimensional stability. It would be extremely desirable to find a means for accomplishing this end without the sacrifice of flexibility and impact strength of the oxymethylene polymer.

British Pat. 1,133,490 issued on Nov. 13, 1968, discloses an oxymethylene polymer composition containing a silicate, preferably talc, at from 0.0001 percent to 0.5 weight percent based on the weight of the oxymethylene polymer, said oxymethylene polymer having an average spherulite diameter from 4 to 8 microns. This controlled spherulite size modified oxymethylene polymer has increased dimensional stability, and increased hardness and tensile strength. However, the use of such silicates yields improvements in dimensional stability, hardness and tensile strength at the marked sacrifice in flexibility and impact strength of the oxymethylene polymer.

The present invention is based on the discovery that the spherulite size of oxymethylene polymers can be controlled to yield oxymethylene polymers with a spherulite size below 100 microns and preferably below 20 microns having improved dimensional stability, hardness and tensile strength without a marked sacrifice in flexibility and impact strength by incorporating into the oxymethylene polymer a hydrophobic silica.

The invention is accomplished by preparing a composition comprising a substantially homogenous admixture including (A) a normally solid, oxymethylene polymer, and (B) an hydrophobic silica.

THE OXYMETHYLENE POLYMER

The oxymethylene polymer that is modified in practicing this invention may be, as previously has been indicated, homopolymeric oxymethylene or an oxymethylene copolymer. The two are not the full equivalent of each other as the main or primary component in the modified polymeric compositions of this invention. The preferred primary component is a copolymer of oxymethylene.

The oxymethylene polymers useful in this invention may be prepared as broadly and more specifically described in the second through the sixth paragraphs of this specification and in the citations therein given. An oxymethylene copolymer of the kind disclosed and claimed in the aforementioned Walling et al. patent is especially suitable for use as the copolymer that is modified in producing the polymeric compositions with which this invention is concerned.

Thus, the oxymethylene copolymer used in carrying this invention into effect may be a polymer having a structure comprising recurring units represented by the general formula (I)

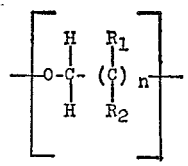

wherein each $R_1$ and $R_2$ is selected from the group consisting of hydrogen, lower alkyl and halogen-substituted lower alkyl radicals, and wherein $n$ is an integer from zero to three inclusive, and $n$ being zero in from 85% to 99.9% of the recurring units. Each lower alkyl radical preferably has from one to two carbon atoms, inclusive. The oxymethylene copolymer may be defined more specifically as a normally solid, substantially water-insoluble copolymer, the repeating units of which consist essentially of (A)

—OCH₂— groups interspersed with (B) groups represented by the general formula (II)

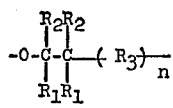

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three inclusive.

Each lower alkyl radical preferably has from one to two carbon atoms, inclusive. The —OCH₂— units of (A) constitute from 85% to 99.9% of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III)

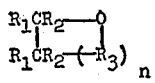

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene and lower alkyl and haloalkyl-substituted oxymethylene radicals, and $n$ is an integer from zero to three inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula (IV)

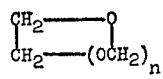

wherein $n$ represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to from 0.1 mole percent to about 40 mole percent of —OR— groups, and more particularly from 60:99.6 mole percent of the former to 0.4:40 mole percent of the latter. As indicated hereinbefore, the most preferred copolymers are those having from about 85 mole percent to 99.9 mole percent of recurring oxymethylene groups and from 0.1 to 15 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula (V)

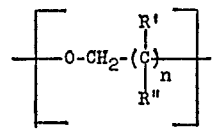

wherein $n$ represents an integer from 0 to 5, inclusive, and representing 0 in from 60 to 99.6 mole percent of the recurring units; and R' and R" represent inert substituents, that is, substituents which are free from interfering functional groups and will not induce undesirable reactions. Thus, one advantageously may utilize oxymethylene copolymers having a structure comprising oxymethylene and oxymethylene recurring units wherein from 60 to 99.9 e.g., from 60 or 70 to 99.6 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI)

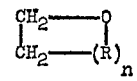

wherein $n$ represents an integer from zero to 4, inclusive, and R represents a divalent radical selected from the group consisting of (a) $CH_2$, (b) $CH_2O$, and (c) any combination of $CH_2$ and $CH_2O$.

Examples of specific cyclic ethers that may be used in preparing copolymers of the kind embraced by Formula VI, in addition to the cyclic ethers previously mentioned with reference to the copolymers embraced by Formula IV, and of acetals and cyclic esters that may be employed instead of cyclic ethers, are 1,3,5-trioxepane, 1,3-dioxepane, betapropiolactone, gammabutyrolactone, neopentyl formal, pentaerythritol diformal, paraldehyde, and butadiene monoxide. In addition, glycols including, for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety (i.e., $R_2O$ wherein $R_2$ represents methylene or substituted methylene), it will be understood, of course, by those skilled in the art that instead of formaldehyde, other sources of the oxymethylene moiety may be used; e.g., paraformaldehyde, trioxane, acetaldehyde, propionaldehyde, and the like. One may also employ cyclic acetals, e.g., 1,3,5-trioxepane, in lieu of both the cyclic ether and formaldehyde.

The term "oxymethylene" as used in the specification and claims of this application, unless it is clear from the context that a more specific meaning is intended, includes substituted oxymethylene, wherein the substituents are inert with respect to the reactions in question; that is, the substituents are free from any interfering functional group or groups that would cause or result in the occurrence of undesirable reactions.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and higher multicomponent polymers. The term "polymer" (unless it is clear from the context that the homopolymer or a copolymer is intended) includes within its meaning both homopolymers and copolymers.

In some cases it is especially desirable to use oxymethylene terpolymers as the oxymethylene polymer component of the compositions of this invention, e.g., in making molding compositions especially adapted for use in making blow-molded or otherwise shaped articles e.g., bottles or other types of containers. Oxymethylene terpolymers that are particularly useful in such applications, as well as for other purposes, include those disclosed in copending U.S. application Ser. No. 444,787, filed Apr. 1, 1965 (now abandoned), by W. E. Heinz and F. B. McAndrew, assigned to the same assignee as the instant invention, and which by this cross-reference is made a part of the disclosure of the present application. The aforesaid copending application Ser. No. 444,787 is a continuation-in-part of application Ser. No. 229,715, filed Oct. 10, 1962 (now abandoned), which in turn is a continuation-in-part of application Ser. No. 153,720, filed Nov. 20, 1961 (also now abandoned).

The oxymethylene polymers that are modified to produce the compositions of this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alphapinene).

The oxymethylene polymer component of the compositions of this invention may be, if desired, oxymethylene polymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in the copending application of Frank M. Berardinelli, Ser. No. 372,390, filed June 3, 1964, as a continuation-in-part of application Ser. No. 102,097, filed Apr. 11, 1961, now abandoned. Application Ser. No. 372,390 is assigned to the same assignee as the present invention, and by this cross-reference is made a part of the disclosure of the instant application.

Catalysts suitable for use in polymerizing trioxane or formaldehyde alone or with other copolymerizable components in producing the oxymethylene polymers that are modified to produce the compositions of this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, maganic fluoride, mercuric fluoride, silver fluoride, zinc fluoride, ammonium bifluoride, phosphorous pentafluoride, hydrogen fluoride, and compounds containing these materials, such as boron fluoride coordinate complexes with organic compounds, particularly those in which oxygen or sulfur is a donar atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stanic chloride and stannous chloride.

The particularly preferred catalysts are boron fluoride and boron fluoride-containing materials, such as boron fluoride monohydrate, boron fluoride dihydrate and boron fluoride trihydrate as well as boron fluoride coordinate complexes with organic compounds as mentioned previously.

As indicated earlier in this specification, it is also within the purview of this invention to utilize oxymethylene polymers, including homopolymers of trioxane or of formaldehyde, the molecules of which have been "endcapped" by known methods of etherification or of esterification.

THE HYDROPHOBIC SILICA

The hydrophobic silica contemplated for use herein may be prepared from any of the well-known forms of silica such as (1) silica acrogel, a colloidal silica which may be prepared by displacing the water from a silica hydrogel by a low-boiling, water-miscible, organic liquid, heating in an autoclave or the like above the critical temperature of the liquid, and then venting the autoclave, (2) so-called fume silica, a colloidal silica obtained by burning silicon tetrachloride and collecting the resulting silica smoke and (3) a precipitated silica prepared by the "distabilization of a water-soluble silica under conditions which do not permit the formation of a gel structure, but rather cause the flocculation of silica particles into coherent aggregates such as by the addition of sodium ions to a sodium silicate solution."

Any suitable method may be employed for treating the normally hydrophilic silica to render it hydrophobic. One method which has proved very satisfactory is to permanently affix a liquid hydrophobic polysiloxane oil onto the silica particles. Any suitable method may be employed for permanently affixing the polysiloxane oil onto the silica particles. One method involves spraying a polysiloxane oil onto the precipitated silical particles. After the polysiloxane oil has been sprayed on the silica particles, the sprayed particles are then heated for at least one-half hour at temperatures of above 150° C. If heating is not carried out the polysiloxane oil can be easily eluted from the precipitated silica particles. The heating may be carried out for periods of up to about 30 hours, preferably about 17 hours, but generally heating is stopped after 20 hours since no beneficial results are produced by such prolonged heating. Any temperature above 150° C. may be utilized to permanently affix the polysiloxane oil on the silica particles. Generally temperatures above 350° C. will degrade many of the lower boiling polysiloxane oils. Hence it is seldom necessary or advantageous to utilize temperatures above 350° C.

The polysiloxane oil that is affixed to the precipitated silica particles so as to render the precipitated silica hydrophobic, may be any alkyl, aryl, alicyclic or aralkyl siloxane or polysiloxane having a viscosity of from about 10 centistokes to about 3000 centistokes at 25° C. Generally the alkyl polysiloxanes are preferred which have viscosities of from 40 centistokes to 1000 centistokes at 25° C. Typical alkyl polysiloxanes which may be utilized to render the silica relatively hydrophobic include dimethyl polysiloxane, diethyl polysiloxane, dipropyl polysiloxane, methyl ethyl polysiloxane, dioctyl polysiloxane, dihexyl polysiloxane, methyl hydrogen polysiloxane, methyl propyl polysiloxane, dibutyl polysiloxane, didodecyl polysiloxane, etc. (all having viscosities of from about 10 to 3000 centistokes at 25° C.). The amount of the polysiloxane oil utilized to treat the precipitated silica for a period of at least one-half hour to render the silica hydrophobic, may vary from 0.5% to about 50% by weight based on the weight of the hydrophobic precipitated silica component. However, amounts from about 0.5% to about 20% based on the weight of the hydrophobic precipitated silica component (hydrophilic silica and the polysiloxane oil), of the polysiloxane oil, treating times of from about one-half hour to about three hours are usually satisfactory and are preferred.

The relatively hydrophilic silica may also be rendered hydrophobic by treatment with organo-silicon halides or mixtures of organosilicon halides. Examples of organosilicon halides suitable for this purpose are given in U.S. 2,306,222 and U.S. 2,412,470, and included alkyl, aryl alicyclic and/or aralkyl silicon halides. The organo-silicon halides which may be used to render the hydrophilic silica hydrophobic include organic halosilanes such as dimethyl dichloro silane, diphenyl dichloro silane, diethyl dichloro silane, dimethyl dibromo silane, phenyl methyl dichloro silane, etc. The treatment of the relatively hydrophilic silica with the organo-silicon halide can generally be carried out by agitating the finely divided silica in a closed container in the presence of vapors of the organo-silicon halide so that the vapors of the organo-silicon halide will be absorbed on the relatively hydrophilic silica. The resulting precipitated silica particles are then rendered relatively hydrophobic since the organo-silicon halide absorbed on the silica is converted to corresponding organic polysiloxane due to the presence of moisture within the precipitated silica. In carrying out this treating step, the amount of organo-silicon halide and the length of treatment will vary depending upon the surface area of the precipitated silica and the nature of the organo-silicon halide employed. In carrying out this procedure, it will be satisfactory to use from about 0.5 to 50% by weight based upon the weight of the hydrophobic precipitated silica, of the organo-silicon halide and a time of treatment of at least one-half hour. Generally it is preferred to use from about 0.5% to 20% by weight based upon the weight of the precipitated, hydrophobic silica, of the organo-silicon halide and a treating time of from about one-half hour to about three hours.

Still another method of rendering the silica hydrophobic is by dispersing it in silicone oil, i.e., in a concentration from about 2–10% and heating the dispersion to about 250–300° C. for about an hour more or less. The hydrophobic silica may then be extracted by centrifuging the mixture after dilution with hexane or a similar type of solvent and drying the resulting solid.

The hydrophobic silicas contemplated for use in the present invention can be characterized as having an ultimate particle size of from about 10 millimicrons to about 100 millimicrons, preferably from about 15 millimicrons to about 50 millimicrons, a surface area of from about 50 square meters per gram to about 400 square meters per gram, preferably from about 90 to about 225 square meters per gram, a bulk density of from about 2 to about 25 pounds per cubic foot, preferably from about 2 to about 10 pounds per cubic foot, and a pH of from about 3.5 to about 10, preferably from about 3.6 to about 8.

The modified oxymethylene polymers of the present invention can be produced by preparing a substantially homogeneous admixture including (A) a normally solid, oxymethylene polymer, and (B) an hydrophobic silica. The hydrophobic silica should be present in said admixture at from about .001 to about 2.0 weight percent, and preferably from about 0.1 to about 1.0 weight percent, and most preferably from about 0.4 to about 0.6 weight percent, based upon the weight of said oxymethylene polymer.

The admixture may be prepared by any means known to those skilled in the art whereby a substantially homogeneous composition is obtained. For example, the hydrophobic silica may be incorporated into the plastic polymer while the latter if being kneaded, e.g., on heated rolls or during passage through screw-type or other type of mixer-extruder apparatus. Or, the hydrophobic silica may be blended with finely divided polymer in any suitable blending apparatus and the blend then extruded to form a substantially homogeneous composition.

The modified oxymethylene polymers of the present invention may also include, if desired, plasticizers, fillers, pigments, thermal stabilizers, antioxidants, or other stabilizers such as those which are stabilizers against degradation by ultra-violet light.

In order that those skilled in the art may better understand how the present invention can be carried into effect, the following examples are given by way of illustration and not by way of limitation. All parts and percentages are by weight unless otherwise stated.

Example I

The oxymethylene polymer (acetal polymer) used in this example is a trioxane-ethylene oxide copolymer containing about 2 weight percent of comonomer units derived from ethylene oxide. It is prepared as previously has been broadly described herein and more specifically in the cited art, e.g., the aforementioned Walling et al. Pat. No. 3,027,352. It is in flake form, and about 70% of the copolymer passes through a 40-mesh screen. It has an inherent viscosity (I.V.) of about 1.2 (measured at 60° C. in 0.1 weight percent solution in p-chlorophenol containing 2 weight percent of alpha-pinene). It has a melt index of about 9.0. (The apparatus used and method of determining melt index are described in ASTM D–1238–57T).

This polymer was extruded on a 1¾ inch Prodex vented extruder at a melt temperature of between about 380° F. and 420° F. and samples were prepared for physical testing.

The physical properties of this polymer are reported in Table I.

An oxymethylene terpolymer comprising 100 parts by weight trioxane, 2 parts by weight ethylene oxide and 0.05 part by weight butanediol diglycidyl ether is substituted for the oxymethylene copolymer of the instant example with substantially similar results.

Example II

The polymer of Example I was blended in a Henschel mixer with 0.5 weight percent of talc (having an average particle size of about 25 microns) based upon the weight of the oxymethylene polymer.

The blend was then extruded on a 1¾ inch Prodex vented extruder at a melt temperature between about 380° and 420° F. and samples were prepared for physical testing.

The physical properties of this polymer are reported in Table I.

This example described that talc increases hardness, and tensile strength of the oxymethylene polymer at a marked sacrifice of flexibility and impact strength.

An oxymethylene terpolymer comprising 100 parts by weight trioxane, 2 parts by weight ethylene oxide and 0.05 parts by weight butanediol diglycidyl ether is substituted for the oxymethylene copolymer of the instant example with substantially similar results.

Example III

The polymer of Example I was blended in a Henschel mixer with 0.5 weight percent based upon the weight of the polymer of a hydrophobic silica, wherein the hydrophobic coating was dimethyl polysiloxane. This hydrophobic silica had an ultimate particle size of 15 millimicrons, a surface area of 150 square meters per gram, a bulk density of from about 7–10 pounds per cubic foot, and a pH of 8.

The blend was then extruded as per Example II.

The physical properties of this polymer are reported in Table I.

Various other hydrophobic silicas were tested following the procedures of this example with substantially similar results. These included:

A hydrophobic silica wherein the hydrophobic coating was methylhydrogen polysiloxane.

This hydrophobic silica had an ultimate particle size of 16 millimicrons, a surface area of 215 square meters per gram, a bulk density of 7–10 pounds per cubic foot, and a pH of 5.5.

QUSO M51, a hydrophobic silica sold by the Philadelphia Quartz Company, with an ultimate particle size of 18 millimicrons, a surface area of 140 square meters per gram, a bulk density of 7 pounds per cubic foot, and a pH of 5.

Aerosil 972, a hydrophobic silica sold by Degussa, Inc. wherein the hydrophobic coating was an alkylsilane with an average particle size of 20 millimicrons, a surface area of 120±30 square meters per gram, a bulk density of 2–3 pounds per cubic foot and a pH of 3.6–4.0.

An oxymethylene terpolymer comprising 100 parts by weight trioxane, 2 parts by weight ethylene oxide and 0.05 part by weight butanediol diglycidyl ether is substituted for the oxymethylene copolymer of the instant example with substantially similar results.

Table I shows a comparison in properties between the talc modified oxymethylene polymer of the prior art and the new modified oxymethylene polymers of the instant invention. As Table I shows, the incorporation of hydrophobic silica into oxymethylene polymers increases hardness and tensile strength without the marked sacrifice in flexibility and impact strength as exhibited by the talc modified oxymethylene polymers of Example II.

In a similar manner of the physical properties of an oxymethylene homopolymer are improved with the incorporation of hydrophobic silicas.

functional oxygen groups and being selected from the group consisting of compounds having at least two cyclic ether rings having from two to ten carbon atoms in each ring, and dialdehydes and diketones having from two to twenty carbon atoms. An example of a chain-branching agent of (3) is a poly (1,2-epoxide), specifically vinyl cyclohexene dioxide, a sub-group of such terpolymers consists of those having by weight, from about 96.1 to 97.9 percent oxymethylene units, about 2.0 to 2.9 percent of oxymethylene units, and less than about 1%, preferably between about 0.05 and 0.80 percent, of units from the chain-branching agent.

The bi- or higher multi-functional (i.e., at least bi-functional) compounds are compounds having at least two reactive centers such that the compound is capable of reacting in an at least bi-functional manner with the source of oxymethylene units and the chain-branching agent to form a normally solid, thermoplastic, moldable terpolymer. The bi- or higher multi-functional compounds used in making the terpolymers provide —O—R— units interspersed among the oxymethylene groups; R in the grouping —O—R— represents a divalent radical containing at least two carbon atoms directly linked to each other and positioned in the chain between the two valences. Such substituents advantageously are, for instance, hydrocarbon, halo-hydrocarbon or other groupings that are inert with respect to formaldehyde under the polymerization conditions.

Preferred compounds that are at least bifunctional employed in making terpolymers include (1) those having at least two functional groups, (2) those having at least one unsaturated bond, (3) those having at least one openable ring structure and (4) combinations of two or more of (1), (2) and (3). Specific examples of compounds that are at least bi-functional and are preferably cyclic ethers having adjacent carbon atoms, include ethylene oxide, 1,3-dioxolane, and others mentioned hereinbefore, in Walling et al. U.S. Pat. No. 3,027,352, the previously cited Kern

TABLE I

| Example number | Parts polymer | Modifier | Tensile strength (p.s.i.) | Rockwell (M) Hardness | Flexural strength (p.s.i.×10³) | Izod impact strength (ft. lb./in.) | |
|---|---|---|---|---|---|---|---|
| | | | | | | Notched | Unnotched |
| I | 100 | 0 | 8,300 | 77 | 3.4 | 1.2 | 19 |
| II | 100 | 0.5 part talc | 8,800 | 78 | 4.2 | 0.8 | 9 |
| III | 100 | 0.5 part hydrophobic silica | 8,800 | 82 | 3.7 | 1.0 | 13 |

It will be understood, of course, by those skilled in the art that the present invention is not limited to the specific oxymethylene polymers, hydrophobic silicas, or to the procedures and percentages in formulating the compositions and in forming molded articles therefrom that have been given in the foregoing examples for purpose of illustration. For instance, instead of a copolymer of trioxane with from about 0.1 to about 15 mole percent of ethylene oxide, specifically 2 mole percent, there may be employed binary polymers wherein a corresponding molar percentage of dioxolane is substituted for ethylene oxide in making the copolymer.

Also, various other oxymethylene binary and ternary polymers may be used instead of the particular binary and ternary polymers employed in the various examples, and which are disclosed both broadly and specifically in the aforementioned Heinz et al. application Ser. No. 444,787.

The oxymethylene terpolymers used in the compositions of this invention may be defined as being normally solid, substantially water-insoluble terpolymer of (1) from 75 to 99.9 weight percent of a source of a chain of recurring oxymethylene units, e.g., trioxane; (2) from 0.1 to about 18 weight percent of a bi- or higher multifunctional compound such as a cyclic ether having a single cyclic ether ring having adjacent carbon atoms therein, and having from two to ten carbon atoms in said ring, e.g., ethylene oxide; and (3) from 0.01 to about 7 weight percent of a chain-branching agent having at least two et al. article, and the aforementioned Heinz et al. application.

The particular chain-branching agents employed may be varied considerably, the chosen agent depending upon such influencing factors, as, for example, the particular relationship and conditions under which it is used, its cost, etc. Among suitable chain-branching agents may be mentioned those having at least two functional oxygen groups including (1) cyclic ethers having at least two cyclic ether rings, e.g., 2,2-(trimethylene)bis-1,3-dioxolane, and particularly those compounds having (a) at least two epoxy rings, such as polyepoxides, including diepoxides, triepoxides, etc., (b) at least two formal rings, e.g., pentaerythritol diformal, and (c) at least one epoxy ring and at least one formal ring, e.g., monocrotylidene trimethylolethane monoepoxide; and (2) compounds having at least two oxo groups such as dialdehydes and diketones, e.g., glutaraldehyde terephthalide and acrolein dimer.

Suitable polyepoxides include those that may be prepared by the epoxidation of compounds having two or more olefinic linkages. Diepoxides of diolefins are usually employed, and the epoxidized olefinic bonds may be of aliphatic or cycloaliphatic structures. More specific examples of diepoxides that may be used include butadiene dioxide, vinylcyclohexane dioxide (1-epoxyethyl-3,4-epoxycyclohexane), linonene dioxide, resorcinol, diglycidyl ether, bis-epoxydicyclopentyl ether of ethylene glycol, dicyclopentadiene dioxide and dicrotylidene pentaerythritol diepoxide. Suitable higher polyepoxides include the various triepoxides, e.g., triglycidyl trimethylol propane.

The preferred terpolymers used in practicing the present invention contain (1) oxymethylene groups interspersed with (2) oxyalkylene groups with adjacent carbon atoms derived from the bi- or higher multi-functional compound employed (preferably a cyclic ether having adjacent carbon atoms) and (3) oxyalkylene groups having carbon atoms linked to other chains, the last-named groups being derived from the chain-branching agent. Still more preferred terpolymers are those wherein the oxyalkylene groups of (2) supra, are oxyethylene groups derived by opening the ring structure of a cyclic ether containing oxyethylene groups, e.g., ethylene oxide, 1,3-dioxolane, and the like.

Specific terpolymers that are useful in practicing the present invention include those obtained by copolymerization of the following components in the stated approximate parts by weight:

100 parts by weight trioxane, 2 parts by weight ethylene oxide and 0.1 part by weight vinyl cyclohexene oxide;

100 parts by weight trioxane, 2 parts by weight ethylene oxide and 0.5 part by weight diacetal of molonaldehyde and ethylene glycol;

100 parts by weight trioxane, 2 parts by weight ethylene oxide and 2 parts by weight sorbitol triformal;

100 parts by weight trioxane, 2 parts by weight ethylene oxide and 0.5 part by weight vinylcyclohexene oxide;

100 parts by weight trioxane, 2 parts by weight ethylene oxide and 0.5 part by weight butadiene dioxide;

100 parts by weight trioxane, 2 parts by weight ethylene oxide and 0.3 part by weight triepoxide of the triallyl ether of trimethylolpropane;

100 parts by weight trioxane, 12.6 parts by weight 1,3-dioxolane and 0.5 part by weight vinylcyclohexene dioxide;

100 parts by weight trioxane, 2 parts by weight ethylene oxide and 0.5 part by weight resorcinol diglycidyl ether;

100 parts by weight trioxane, 2.1 parts by weight ethylene oxide and 0.5 part by weight pentaerythritol diformal; diformal;

100 parts by weight trioxane, 2.2 parts by weight ethylene oxide and 1.0 parts by weight pentaerythritol diformal;

100 parts by weight trioxane, 16.8 parts by weight 1,3-dioxolane and 0.5 part by weight vinylcyclohexene dioxide;

100 parts by weight trioxane, 2 parts by weight ethylene oxide and 0.1 part by weight diglycidyl ether of bisphenol A.

It is to be understood that the foregoing detailed description is given merely by way of illustration and that many variations may be made therein without departing from the spirit and scope of the invention.

What is claimed is:

1. A polyoxymethylene composition comprising:
   (A) an oxymethylene polymer containing at least 60 mole percent of recurring oxymethylene groups; said polymer having a number average molecular weight of at least 10,000 and a melting point of at least 150° C. and
   (B) from about 0.001 to about 2.0 weight percent of a hydrophobic silica based upon the weight of said oxymethylene polymer and wherein said hydrophobic silica has an ultimate particle size of from about 10 to about 100 millimicrons, a surface area of from about 50 to about 400 square meters per gram, a bulk density of from about 2 to about 25 pounds per cubic foot and a pH of from about 3.5 to about 10.

2. The composition of claim 1 wherein said hydrophobic silica is present at from about 0.1 to about 1.0 weight percent based upon the weight of said oxymethylene polymer and wherein said hydrophobic silica has an ultimate particle size of from about 15 millimicrons to about 50 millimicrons, a surface area from about 90 to about 225 square meters per gram, a bulk density from about 2 to about 10 pounds per cubic foot and a pH of from about 3.6 to about 8.

3. The composition of claim 2 wherein said hydrophobic silica has as its hydrophobic coating an alkyl polysiloxane.

4. The composition of claim 3 wherein said alkyl polysiloxane coating is dimethyl polysiloxane.

5. The composition of claim 3 wherein said alkyl polysiloxane coating is methyl hydrogen polysiloxane.

6. The composition of claim 1, wherein said polymer is an oxymethylene copolymer comprising 85 percent to about 99.9 weight percent recurring $-OCH_2-$ groups interspersed with groups of the formula:

$$-O-\underset{R_1}{\overset{R_2}{C}}-\underset{R_1}{\overset{R_2}{C}}-(R_3)_n$$

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and $n$ is an integer from zero to three, inclusive, each lower alkyl radical having from one to two carbon atoms, inclusive, said $-OCH_2-$ groups consisting from 85 percent to 99.9 percent of the recurring units and said groups represented by the formula:

$$-O-\underset{R_1}{\overset{R_2}{C}}-\underset{R_1}{\overset{R_2}{C}}-(R_3)_n$$

being incorporated during the step of copolymerization to produce said copolymer by the opening up of the ring of a cyclic ether having adjacent carbon atoms by the breaking of an oxygen-to-carbon linkage.

7. The composition of claim 6 wherein said cyclic ether is represented by the formula:

$$\begin{matrix} CH_2-O \\ | \quad \quad | \\ CH_2-(OCH_2) \end{matrix}_n$$

wherein $n$ represents an integer from zero to two.

8. The composition of claim 1 wherein the oxymethylene polymer is an oxymethylene homopolymer.

9. The composition of claim 1 wherein the oxymethylene polymer (component A) of the admixture is a normally solid, substantially water-insoluble terpolymer of
   (1) from 75 to 99.9 weight percent of trioxane;
   (2) from 0.1 to about 18 weight percent of ethylene oxide; and
   (3) from 0.01 to about 7 weight percent of a chain-branching agent having at least two functional oxygen groups and being selected from the group consisting of compounds having at least two cyclic ether rings having from two to ten carbon atoms in each ring, and dialdehydes and diketones having from two to twenty carbon atoms.

10. The composition of claim 9 wherein the chain-branching agent is butanediol diglycidyl ether.

References Cited

UNITED STATES PATENTS

| | | | |
|---|---|---|---|
| 3,201,371 | 8/1965 | Behrends et al. | 260—67 FP |
| 3,132,961 | 5/1964 | Pierpoint et al. | 106—308 O |
| 3,200,090 | 8/1965 | Dolce et al. | 260—37 AL |
| 2,870,108 | 1/1959 | Nickerson | 106—308 M |

LEWIS T. JACOBS, Primary Examiner